US012499737B2

(12) United States Patent
Suslik et al.

(10) Patent No.: US 12,499,737 B2
(45) Date of Patent: Dec. 16, 2025

(54) SYSTEMS AND METHODS FOR PROVIDING A REEL GAME HAVING FEATURES ASSOCIATED WITH PERSISTENT ELEMENTS

(71) Applicant: Aristocrat Technologies Australia Pty Limited, North Ryde (AU)

(72) Inventors: Igor Suslik, St Ives (AU); Matthew Chan, Gordon (AU); Claudia Rae, Waitara (AU); Xin Liu, Denistone West (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 256 days.

(21) Appl. No.: 18/204,732

(22) Filed: Jun. 1, 2023

(65) Prior Publication Data

US 2024/0105014 A1 Mar. 28, 2024
US 2024/0346886 A9 Oct. 17, 2024

(30) Foreign Application Priority Data

Sep. 22, 2022 (AU) ................................ 2022256148

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01); *G07F 17/3258* (2013.01)

(58) Field of Classification Search
CPC ........................................................ G07F 17/34
See application file for complete search history.

(56) References Cited

U.S. PATENT DOCUMENTS 6,290,600 B1 9/2001 Glasson
8,016,661 B2 * 9/2011 Yoshizawa .............. G07F 17/32 463/20
8,226,461 B2 * 7/2012 Gauselmann ........... G07F 17/34 463/16
10,311,668 B1 6/2019 Halvorson
11,532,200 B2 * 12/2022 Meyer ................. G07F 17/3209
11,721,175 B1 * 8/2023 Peterson ............. G07F 17/3267 463/20
2005/0043082 A1 * 2/2005 Peterson ................. G07F 17/32 463/20

(Continued)

*Primary Examiner* — Milap Shah
(74) *Attorney, Agent, or Firm* — Armstrong Teasdale LLP

(57) ABSTRACT

A gaming system includes a game controller configured to, for each game round of a game: select symbols from a first set that includes first special symbols for display in symbol positions associated with reels to form a game outcome; select a second special symbol from a second set and associate the selected second special symbol with an initial reel; associate each previously selected second special symbol with a subsequent reel or remove a previously selected second special symbol; evaluate the game outcome to determine any winning symbol combination occurring in the game outcome; for each reel, accumulate any first special symbol occurring in the game outcome and determine a prize value based on the accumulated first special symbols and any second special symbol associated with the reel when an accumulation threshold for the reel is met; and generate an award based on a total of prize values.

20 Claims, 10 Drawing Sheets

(56) References Cited

U.S. PATENT DOCUMENTS

| | | | | |
|---|---|---|---|---|
| 2005/0055113 | A1* | 3/2005 | Gauselmann | G07F 17/32 700/91 |
| 2005/0059455 | A1* | 3/2005 | Gerrard | G07F 17/32 463/16 |
| 2005/0075163 | A1* | 4/2005 | Cuddy | G07F 17/3267 463/20 |
| 2006/0068893 | A1* | 3/2006 | Jaffe | G07F 17/3244 463/20 |
| 2007/0087805 | A1 | 4/2007 | Taylor | |
| 2008/0108411 | A1 | 5/2008 | Jensen | |
| 2009/0075722 | A1* | 3/2009 | Louie | G07F 17/32 463/20 |
| 2009/0124345 | A1* | 5/2009 | Gilmore | G07F 17/32 463/20 |
| 2010/0056254 | A1 | 3/2010 | Jackson | |
| 2012/0115565 | A1* | 5/2012 | Schwerdling | G07F 17/3267 463/20 |
| 2014/0018146 | A1* | 1/2014 | Zielinski | G07F 17/3267 463/20 |
| 2019/0130704 | A1* | 5/2019 | Cormack | G07F 17/3213 |
| 2019/0244480 | A1* | 8/2019 | Marsh | G07F 17/3258 |
| 2020/0111328 | A1* | 4/2020 | Bland | G07F 17/3213 |
| 2020/0250923 | A1* | 8/2020 | Ceniceroz | G09G 3/20 |
| 2020/0342715 | A1* | 10/2020 | Hiten | G07F 17/3267 |
| 2021/0043038 | A1* | 2/2021 | Marks | G07F 17/3211 |
| 2021/0065503 | A1 | 3/2021 | Englman | |
| 2021/0110634 | A1* | 4/2021 | Hiten | G07F 17/3213 |
| 2021/0366237 | A1* | 11/2021 | Bouvier | G07F 17/34 |
| 2022/0262206 | A1* | 8/2022 | Djemal | G07F 17/3258 |
| 2023/0087870 | A1* | 3/2023 | Hughes | G07F 17/3244 463/1 |
| 2023/0154286 | A1* | 5/2023 | Warms | G07F 17/34 463/20 |
| 2024/0078865 | A1* | 3/2024 | Narducci | G07F 17/3213 |
| 2024/0078875 | A1* | 3/2024 | Crispino | G07F 17/3211 |
| 2024/0127675 | A1* | 4/2024 | Springer | G07F 17/34 |

* cited by examiner

SYSTEMS AND METHODS FOR PROVIDING A REEL GAME HAVING FEATURES ASSOCIATED WITH PERSISTENT ELEMENTS

CROSS-REFERENCE TO RELATED APPLICATION

This application claims priority to Australian Patent Application No. 2022256148, filed Sep. 22, 2022, the disclosure of which is hereby incorporated by reference herein in its entirety.

FIELD

The field of disclosure relates generally to electronic gaming, and more specifically to systems and methods for providing an electronic reel game that has features associated with multiple symbols that persist through plays of the game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, a gaming system includes a display for displaying game outcomes of a game to a player and a game controller in communication with the display. The game controller includes a processor and memory storing instructions that are executable by the processor and that, when executed, cause the game controller to, for each game round of the game: select, from a first set of symbols defined by symbol data using a random number generator (RNG), a plurality of symbols for display in a plurality of symbol positions associated with one or more reels to form a game outcome, the first set of symbols including at least one first special symbol; determine, using the RNG, whether to select a second special symbol from a second set of symbols, and, where determined, select the second special symbol and associate the selected second special symbol with an initial reel; associate each second special symbol selected during a previous game round with a subsequent reel for the game outcome, or remove a second special symbol selected during the previous game round from the game outcome where the second special symbol selected during the previous game round was associated with a terminal reel in the previous game round; evaluate the game outcome to determine any winning symbol combination occurring in the game outcome; for each reel, accumulate any first special symbol occurring in the game outcome and determine whether an accumulation threshold for the reel is met, and if the accumulation threshold is met, determine a prize value based on the accumulated first special symbols and any second special symbol associated with the reel for the game outcome; and generate an award based on a total of prize values.

In some embodiments, accumulation thresholds defined for each reel differ for one or more reels.

In some embodiments accumulated first special symbols are displayed in a plurality of respective display areas each associated with each respective reel.

The first special symbols included on each reel may differ for one or more reels.

The second set of symbols may include a plurality of symbols enabling different functions.

In some embodiments, the second set of symbols may include any one or more of: WILD, Jackpot, and multiplier symbols.

In some embodiments, where a selected second special symbol is a WILD symbol, for the reel associated with the wild symbol, the reel becomes a wild reel during the subsequent game round.

In some embodiments, where a selected second special symbol is a jackpot symbol, or a multiplier symbol, the function associated with the selected special symbol is triggered where, for the reel associated with the selected second special symbols, the first symbol accumulation threshold is met.

In another embodiment a jackpot game may be initiated responsive to a trigger for the selected second special symbol, wherein a plurality of jackpot symbols are selected from a jackpot symbol set comprising at least one set of n matching jackpot symbols, and wherein the plurality of jackpot symbols selected from the jackpot symbol set are allocated to a set of m jackpot symbol display positions, and each respective jackpot symbol is revealed in response to a player selection of the respective jackpot symbol display position and a jackpot prize is awarded responsive to revealing the n matching jackpot symbols. In an embodiment, a limit of p jackpot symbol display positions are selectable, wherein m>p and p>=n.

In another embodiment, a feature game is initiated in response to a feature game trigger and, for each round of the feature game, a second special symbol is determined and selected.

In some embodiments, a feature game is initiated in response to a feature game trigger and a reel associated with a WILD symbol is converted to a WILD reel for one or more rounds of the feature game. In some embodiments, the reel that was associated with the WILD symbol persists as a WILD reel for remaining feature game rounds.

In another aspect, a method of electronic gaming implemented on a gaming system includes: executing play of a game including controlling display of game outcomes of the game; and for each game round of the game: selecting, from a first set of symbols defined by symbol data using a random number generator (RNG), a plurality of symbols for display in a plurality of symbol positions associated with one or more reels to form a game outcome, the first set of symbols including at least one first special symbol; determining, using the RNG, whether to select a second special symbol from a second set of symbols, and, where determined, selecting the second special symbol and associating the selected second special symbol with an initial reel; associating each second special symbol selected during a previous game round with a subsequent reel for the game outcome, or removing a second special symbol selected during the previous game round from the game outcome where the second special symbol selected during the previous game round was associated with a terminal reel in the previous game round; evaluating the game outcome to determine any winning symbol combination occurring in the game outcome; for each reel, accumulating any first special symbol occurring in the game outcome and determining whether an accumulation threshold for the reel is met, and if the accumulation threshold is met, determining a prize value based on the accumulated first special symbols and any second special symbol associated with the reel for the game outcome; and generating an award based on a total of prize values. The method may include additional, less or alternate actions, including those discussed with respect to other aspects of the disclosure and described elsewhere herein.

In another aspect, a non-transitory computer-readable storage medium with instructions stored thereon that, in response to execution by at least one processor, cause the at least one processor to: execute play of a game including by controlling display of game outcomes of the game; and for each game round of the game: select, from a first set of symbols defined by symbol data using a random number generator (RNG), a plurality of symbols for display in a plurality of symbol positions associated with one or more reels to form a game outcome, the first set of symbols including at least one first special symbol; determine, using the RNG, whether to select a second special symbol from a second set of symbols, and, where determined, select the second special symbol and associate the selected second special symbol with an initial reel; associate each second special symbol selected during a previous game round with a subsequent reel for the game outcome, or remove a second special symbol selected during the previous game round from the game outcome where the second special symbol selected during the previous game round was associated with a terminal reel in the previous game round; evaluate the game outcome to determine any winning symbol combination occurring in the game outcome; for each reel, accumulate any first special symbol occurring in the game outcome and determining whether an accumulation threshold for the reel is met, and if the accumulation threshold is met, determine a prize value based on the accumulated first special symbols and any second special symbol associated with the reel for the game outcome; and generate an award based on a total of prize values. The instructions may direct additional, less, or alternate functionality, including that discussed with respect to other aspects of the disclosure and described elsewhere herein.

BRIEF DESCRIPTION OF THE DRAWINGS

Corresponding reference numerals used throughout the drawings indicate corresponding parts.

DETAILED DESCRIPTION

Figure 1:
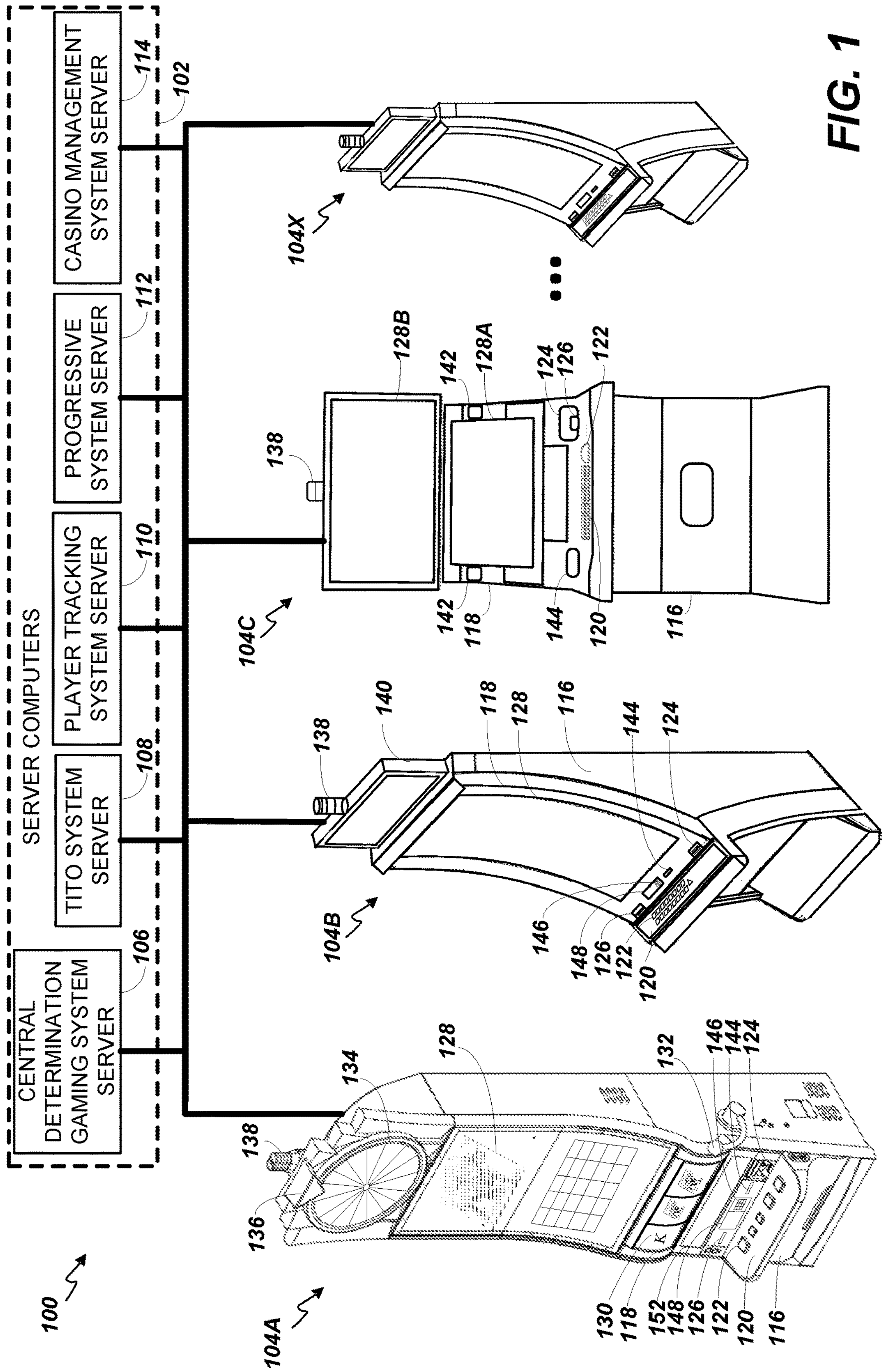
FIG. 1 is an exemplary diagram showing several EGMs networked with various gaming related servers.

Conventional reel games may include base game outcomes in which one or more special symbols are displayed within a reel area and are associated with payout awards and/or features of the reel game (e.g., additional or increased payout values, bonus games, feature games, and the like). In some known reel games, a predefined or preselected number of the special symbols may be required to appear in the reel area during one or more plays of the game to trigger a feature. The special symbols may "persist" throughout plays of the game, for example, may remain displayed within the reel area at the respective locations at which they initially appeared. This may provide a visual indication to a player of the number of special symbols that have appeared and the number of special symbols remaining that need to appear to trigger a feature. While some variations exist for providing reel games that include persistent special symbols throughout plays of the reel game, the variability and flexibility in utilizing persistent symbols remain limited, both in terms of display of the persistent symbols and providing features of the game that are triggered by the accumulation of persistent special symbols. A need exists to address these limitations to facilitate increasing overall variability and flexibility of the reel game while maintaining or reducing the computational resources used while doing so and/or while controlling increased randomness and payout volatility to meet a designated return-to-player (RTP).

Embodiments of the present disclosure provide systems and methods for executing a reel game in which first special symbols for accumulation are included on reels and second special symbols are provided additional to the reels. Each second special symbol enables a function or feature of the reel game (e.g., a WILD reel feature, a jackpot feature, a multiplier feature, or other feature). Both the accumulated first special symbols and the second special symbols may persist (i.e., remain displayed) for more than one game round. Trigger conditions may be required to trigger a function enabled by the second special symbols. For example, accumulation of the first special symbols above a predefined or preselected threshold may be required to trigger a function enabled by the second special symbols. Either the second special symbol function or trigger condition for the second special symbol function may involve interaction between the second special symbol and a reel with which the second special symbol is associated for a game round and from which the accumulated first special symbols are collected. Prize awards for each reel may be affected (e.g., increased) when a function of a second special symbol associated with the reel is triggered. This game mechanic, by interaction between two different persistent elements (e.g., two different persistent special symbols) provides flexibility and variability to the reel game.

One technical problem associated with providing such a game mechanic that involves interaction between two different persistent elements is displaying information and visual feedback related to this interaction within a limited display area. In some embodiments, the first special symbols that appear on reels during game outcome(s) accumulate within a secondary display area adjacent to the reels. For each reel, the secondary display area includes one or more symbol positions for the first special symbols that appear on the reel, and the first special symbols accumulate within the corresponding symbol positions when they appear on the reel and persist (i.e., remain displayed) therein throughout one or more subsequent plays of the game. One or more second special symbols are displayed in or adjacent to the secondary display area and persist with changed location for each subsequent play of the game. During each play of the game, a second special symbol may be displayed adjacent to the secondary display area symbol position(s) associated with a reel to indicate that the second special symbol is associated with that reel for the particular play of the game. A change in a location of a second special symbol represents a change in a reel that the second special symbol is associated with. As the first special symbols accumulate within the corresponding symbol position(s) in the secondary display area for a given reel, the number of remaining symbol positions corresponding to the reel may indicate the remaining number of first special symbols required to trigger a function of a second special symbol associated with the reel for a given play of the game. In this way, the embodiments described herein may facilitate displaying information and providing visual feedback regarding interaction of the first and second special symbols, their association with corresponding reels, and their effect on features of the reel game within a limited display area.

Another technical problem is the use of two persistent special symbols in a reel game increases randomness of the game, which in turn increases payout volatility and the risk that a designated RTP may not be met. The embodiments described herein provide various control tools for managing volatility and RTP in a computationally-effective way. A predetermined weighting table may be used to determine the likelihood of triggering one of the functions using a specific second special symbol and a random determination may be made to select the function of the second special symbol in accordance with the predetermined weighting table. The weighting table may be interchanged with alternate weighting tables to achieve a targeted overall RTP for the game. Furthermore, a trigger monitoring function may be implemented to monitor trigger conditions for multiple different types of second special symbols, or for special trigger conditions based on combinations of symbols selected and displayed in the reel window for a game round. Either the second special symbol function or trigger condition for the second special symbol may involve interaction between the second special symbol and a reel with which the second special symbol is associated for a game round. Thus, adjustment to volatility or payout probability may be made by adjusting the frequency of selection of second special symbols or second special symbol types. Alternatively or additionally, varying the numbers of first special symbols on each reel may be used to adjust probabilities. The appearance of the second special symbol during a given play of the game may also be randomly determined, for example, by an RNG engine that is called to determine whether the second special symbol will appear. In this way, the second special symbol selection alters the probability of an award being based on a combination of both the accumulated first special symbols and a function applied by the second special symbol. Moreover, meeting the accumulation threshold for the first special symbols may also be a trigger for a function of any second special symbol associated with the reel. Advantageously, linking the accumulated first special symbols and second special symbols that enable a function triggered by the first special symbols provides flexibility to the game while facilitating controlling probabilities and volatility of payouts within designated RTP.

In view thereof, the example embodiments described herein facilitate improving gaming device operation, capability, and user interface features by providing a reel-game mechanic that includes two persistent elements (e.g., special symbols) and features associated with the persistent elements. Such improvements introduce technical problems, including at least limited resources for display of the interaction between the persistent elements and increased randomness generated during gameplay resulting in increased payout and RTP rate volatility. In order to provide a technical solution to these technical problems, the example embodiments described herein provide tools that facilitate providing visual display of information and feedback related to the persistent elements within a limited display area as well as managing and/or controlling the degree of randomness and payout and RTP rate volatility during game play, for example, by selectively manipulating the probability of triggering the functions enabled by one or more of the persistent elements and/or linking the operation of the persistent elements. These control tools provide a computationally-effective way to manage volatility for a designated level of RTP for the reel game, while also improving the usability of the reel game.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
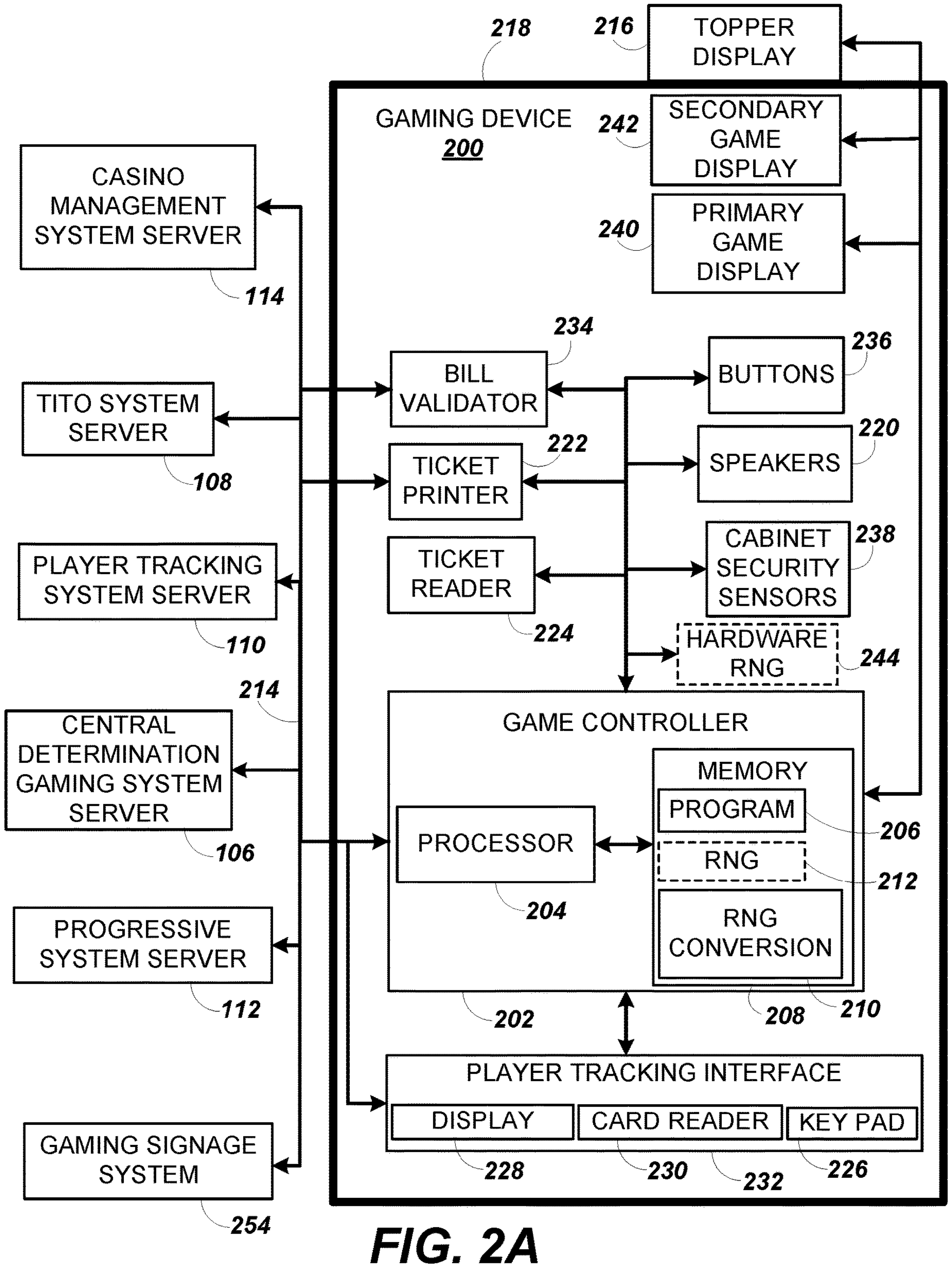
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
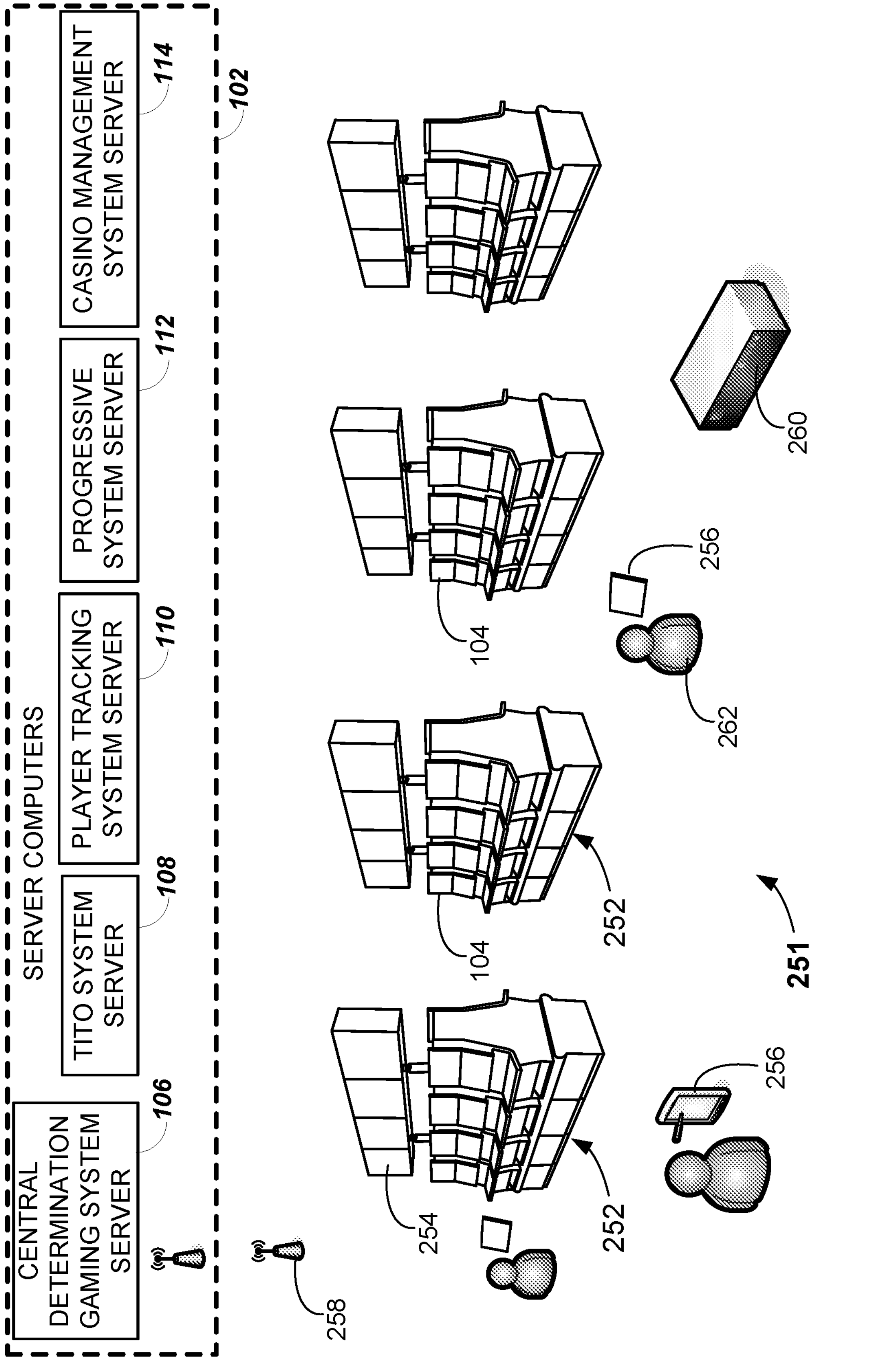
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices

256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
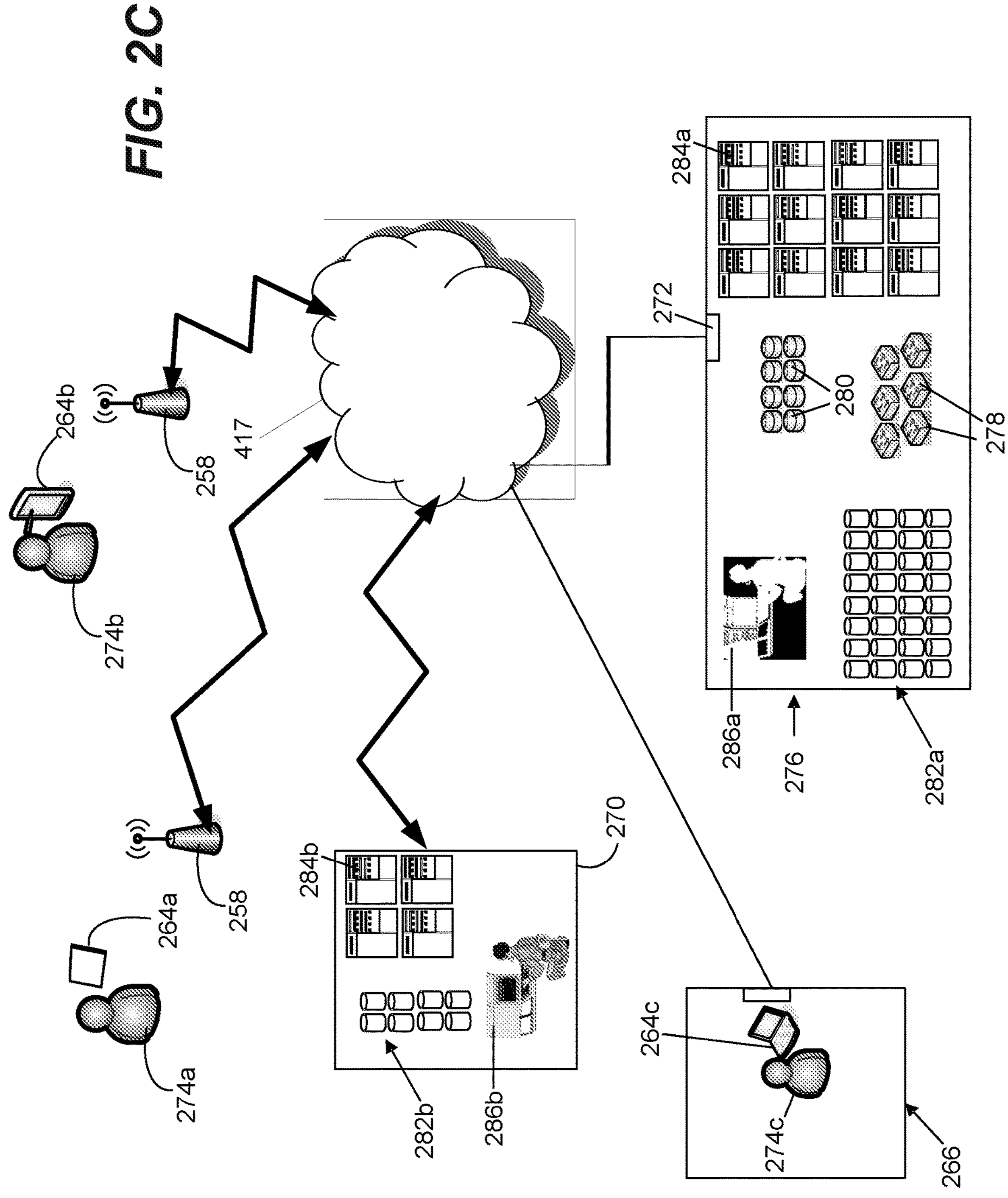
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
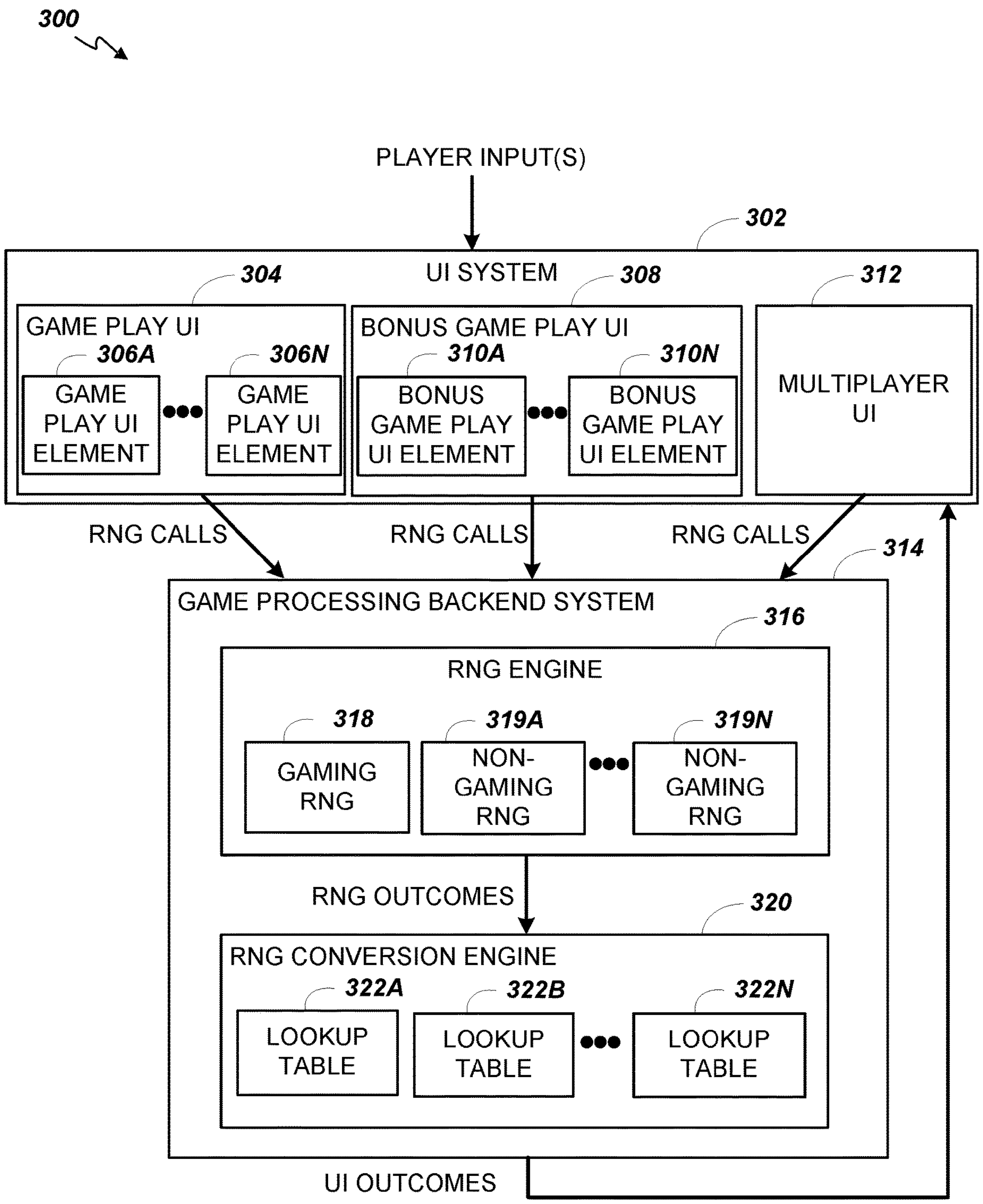
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system

314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The present disclosure includes a game involving a persistent Cash On Reel (COR) feature. For this feature COR symbols which appear on a reel, based on an RNG generated game outcome, are collected or accumulate in a column above the reel displayed by the UI system 302. Embodiments provide a game play mechanic wherein first special symbols for accumulation are included on reels and second special symbols are provided additional to the reels, each second special symbols being operable to enable a function. The second special symbols persist with changed location for each subsequent game outcome. A change in a location of a second special symbol represents a change in a reel that the second special symbol is associated with. For example, the second special symbols may be represented as sequentially scrolling across (e.g., above) the reels on a UI, where the second special symbols are associated with an adjacent reel on the UI. Alternative representations of the second special symbols changing locations, such as random bouncing between reels, are contemplated.

Figure 4:
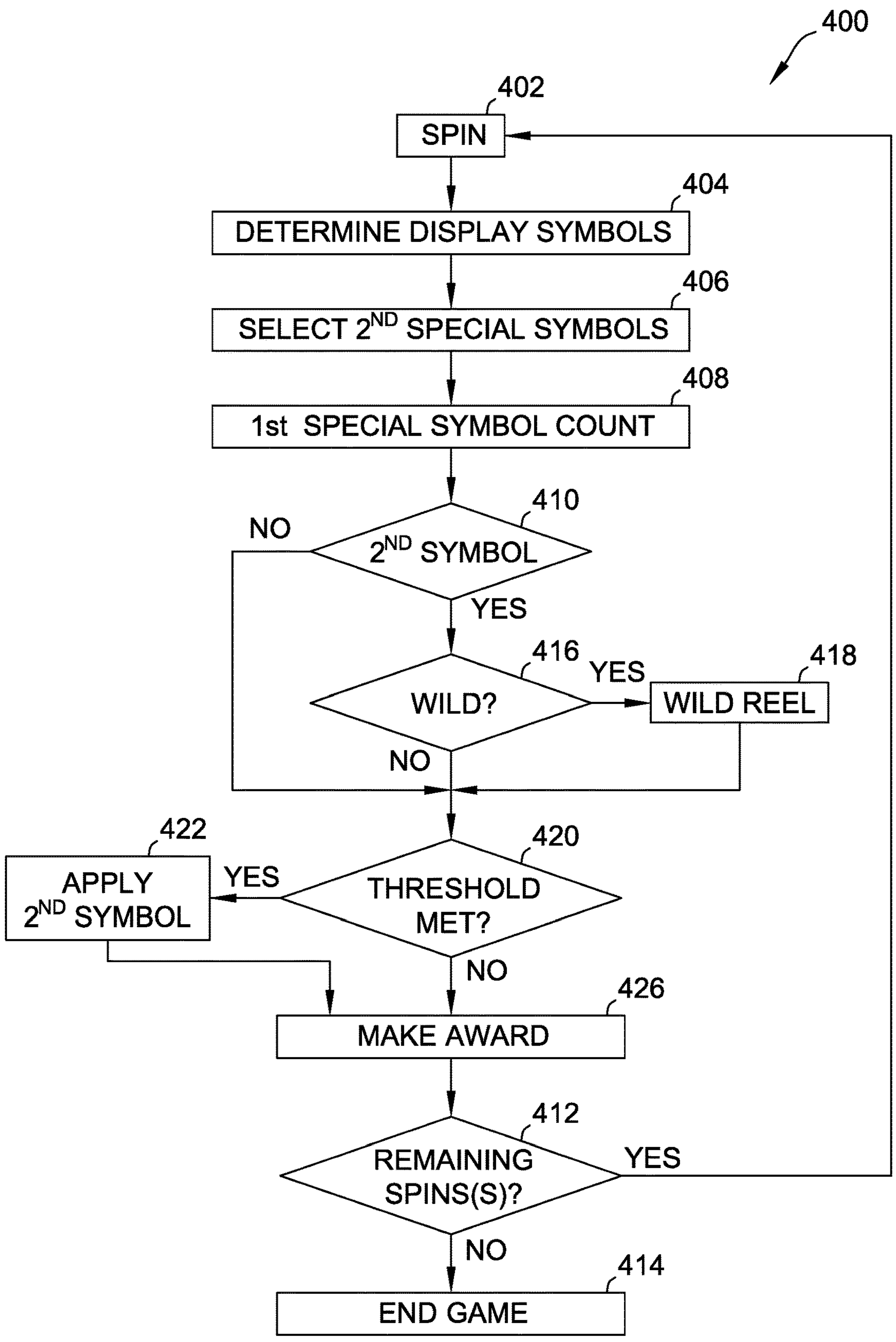
FIG. 4 is a flowchart providing an example of operation of a game controller to execute game play in accordance with an embodiment of the present disclosure.

An example of an embodiment of the game mechanic will now be described with reference to the flowchart of FIG. 4 and gaming architecture of FIG. 3. The game processing backend system 314 is configured to utilize the RNG 318 for selection of a plurality of symbols 402 from the sets of reel symbols defined in symbol data, the reel symbols including first special symbols, (for example replicating a reel spin and selection of symbols based on random reel stop positions) for display in a plurality of symbol positions 404 as generated by the UI system 302. The game processing backend system 314 calls the RNG engine 316 to also select a second special symbol 406 for the UI system 302 to display with the game outcome.

Figure 5:
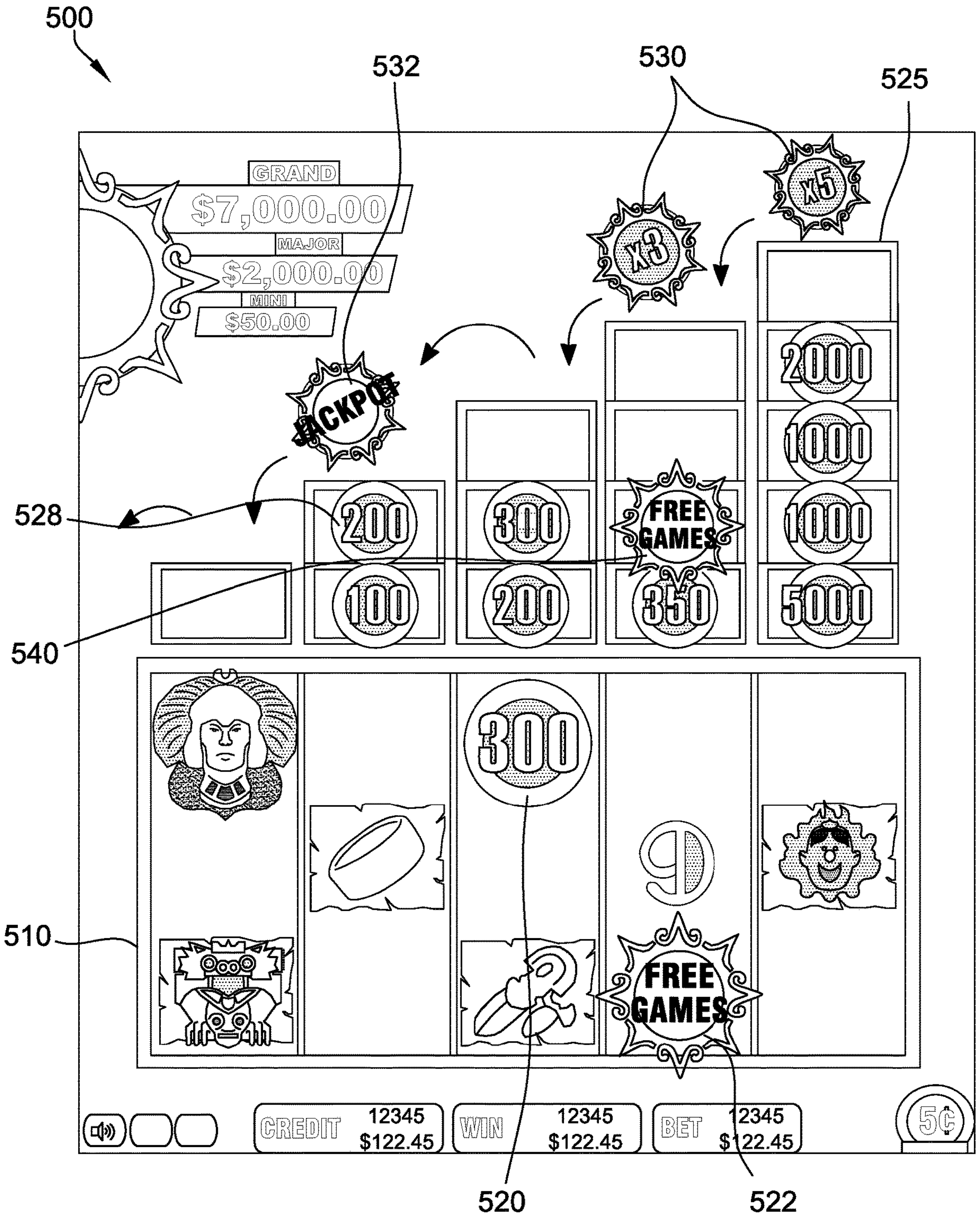
FIG. 5 is an example of a game outcome screen in accordance with a base game of an embodiment of the present disclosure.

The game processing backend system 314 is configured to maintain a count (or a set) of the first special symbol occurrences in the plurality of symbols selected for each game round 408, and provides this count or set to the UI system 302 to generate a graphic illustrative of the accumulated first symbol occurrences for display and visual communication of these accumulated symbols to the player via a UI. In an embodiment, for example as illustrated in FIG. 5 which shows an example of a game display 500, the accumulated first symbols 528 are accumulated in columns 525 above the reel window 510. The length of the columns 525 are indicative of the threshold, in number of symbols, for award of a prize based on the accumulated symbols. Where a first special symbol, for example a "300 credit" symbol 520 or "free games" symbol 522, is displayed by the UI as appearing on a reel in the reel window 510, a corresponding first special symbol, for example a 300 credit symbol 528 corresponding to the 300 credit symbol 520 and/or a free games symbol 540 corresponding to the free games symbol 522, is displayed in a symbol position in the column above the reel, thus the set of symbols accumulated will be displayed in this embodiment. It should be appreciated that the symbol set or symbol count may be illustrated in other ways than columns above the reels, for example groups or other arrangement beside or below the reel window.

Figure 6:
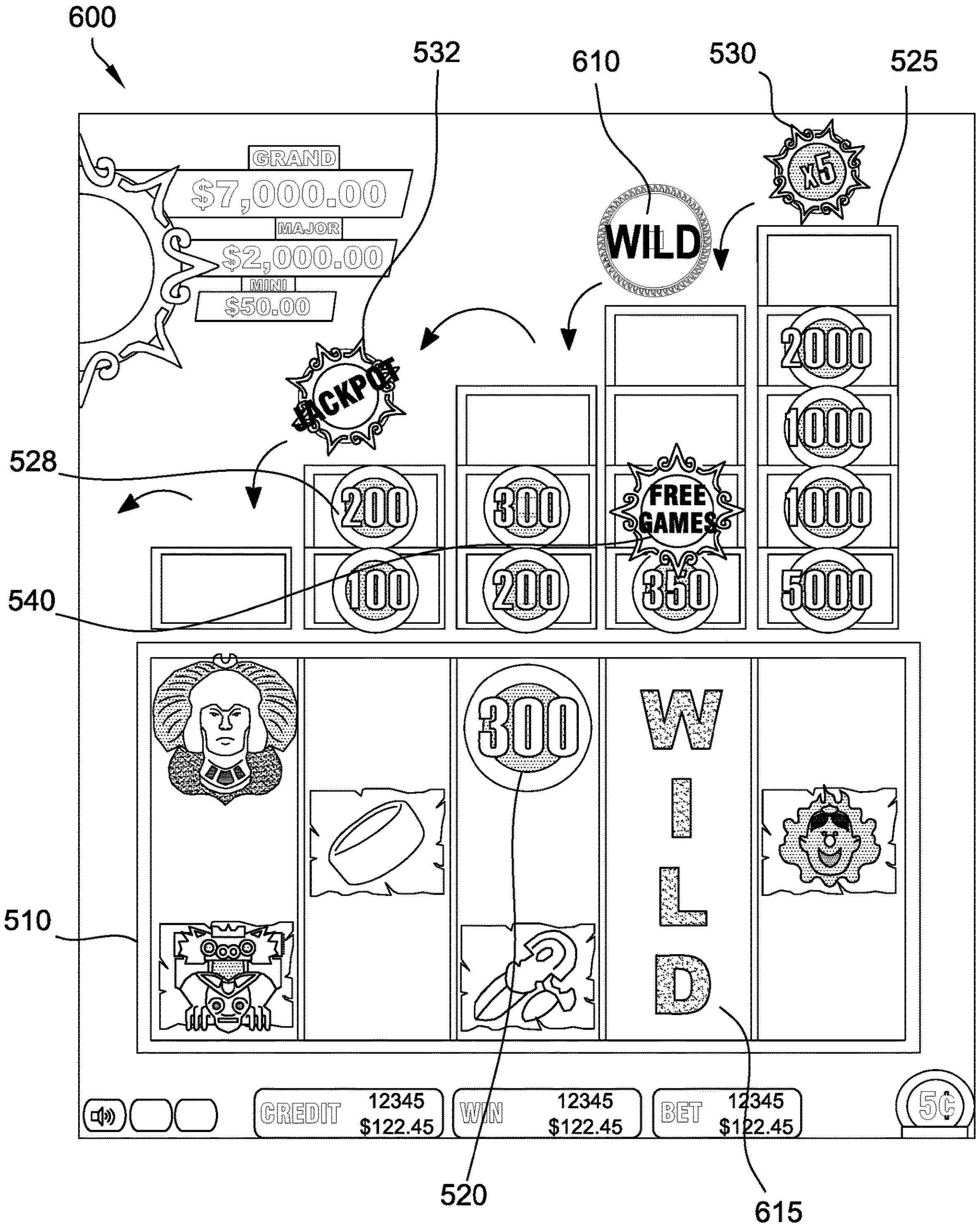
FIG. 6 is an example screen shot or user interface of a game outcome of the embodiment in FIG. 5, showing a WILD reel conversion.

The game controller of the backend system 314 assesses the game outcome 408 to count the first special symbols and determine any award payable for the reel outcomes. The game controller also determines whether any second special symbols are included in the game outcome 410. Where a second special symbol is included, this may alter the award for any accumulated first special symbols and/or apply a function to the reel combination outcome. Where the second special symbol(s) is a WILD 416, the reel associated with the WILD symbol 610 (shown in FIG. 6) becomes a WILD reel 418. As shown in FIG. 6, The UI system causes the reel below the WILD 610 trigger to become WILD 615 at the end of the spin (SCATTERS and COR still pay underneath). In some embodiments the WILD 615 will trigger regardless of the status of the accumulated first special symbols for the reel associated with the WILD (for example, as shown in FIG. 6). In some embodiments a minimum number of COR symbols may be required to have been accumulated (for example, at least one COR symbol may be required) to trigger the WILD 615.

Figure 8:
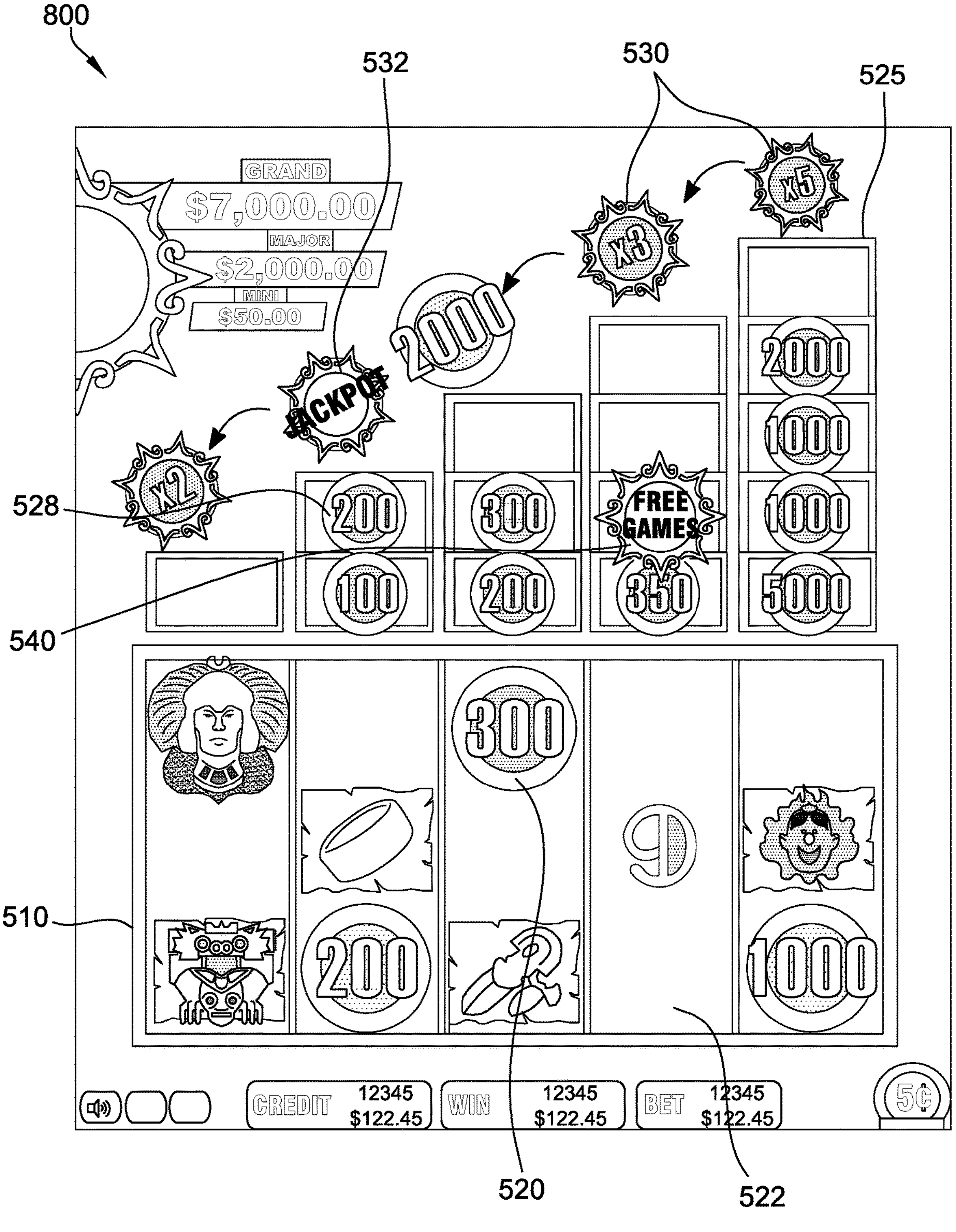
FIG. 8 is an example screen shot or user interface of a gem outcome in accordance with a feature game of an embodiment of the present disclosure.

The game controller of the backend system 314 assesses whether thresholds are met for accumulated first special symbols 420 for each reel. Meeting the accumulation threshold for a reel triggers an award based on the COR symbols for that reel 426. Where a second special symbol is associated with the reel at the time the threshold is met the function associated with the second special symbol 422 is applied to any award 426. For example, where the second special symbol is a multiplier 530, then the total award for the accumulated COR symbols for the reel is multiplied. Where an accumulated first special symbol is a free games symbol 540, the number of free games may also be multiplied based on the second special symbol. Meeting an accumulated symbol count threshold for an accumulated symbol set having a free games symbol may trigger a set of free spin feature game rounds. In an embodiment (for example as illustrated in FIG. 8) for a feature game or free spins game rounds, second special symbols may be associated with all of the reels and scroll sequentially across the reels for each subsequent game outcome.

It should be appreciated that the threshold for accumulating first special symbols for an award may be one for a reel or more than one reels. That is, an instant win occurs where a first special symbol occurs on the reel having a threshold count of one. In the example shown in FIG. 5 this is the first reel (i.e., the leftmost reel).

The accumulated set of symbols and any applied second special symbol are cleared, and no longer persist, once the award is paid.

In an embodiment, free games may be triggered by filling a column containing free games special symbols or spinning up 3 or more SCATTERS special symbols. In one embodiment during the free games, all columns will have scrolling bonuses or WILDs above them. In another embodiment during free games only, if a WILD second special symbol lands on a reel, then that reel becomes WILD for the rest of the free games and an extra free game is added. Once a reel becomes WILD in this embodiment, the WILD symbol may cease to persist, however its function (making the WILD reel for the remaining feature games) persists.

Figure 7:
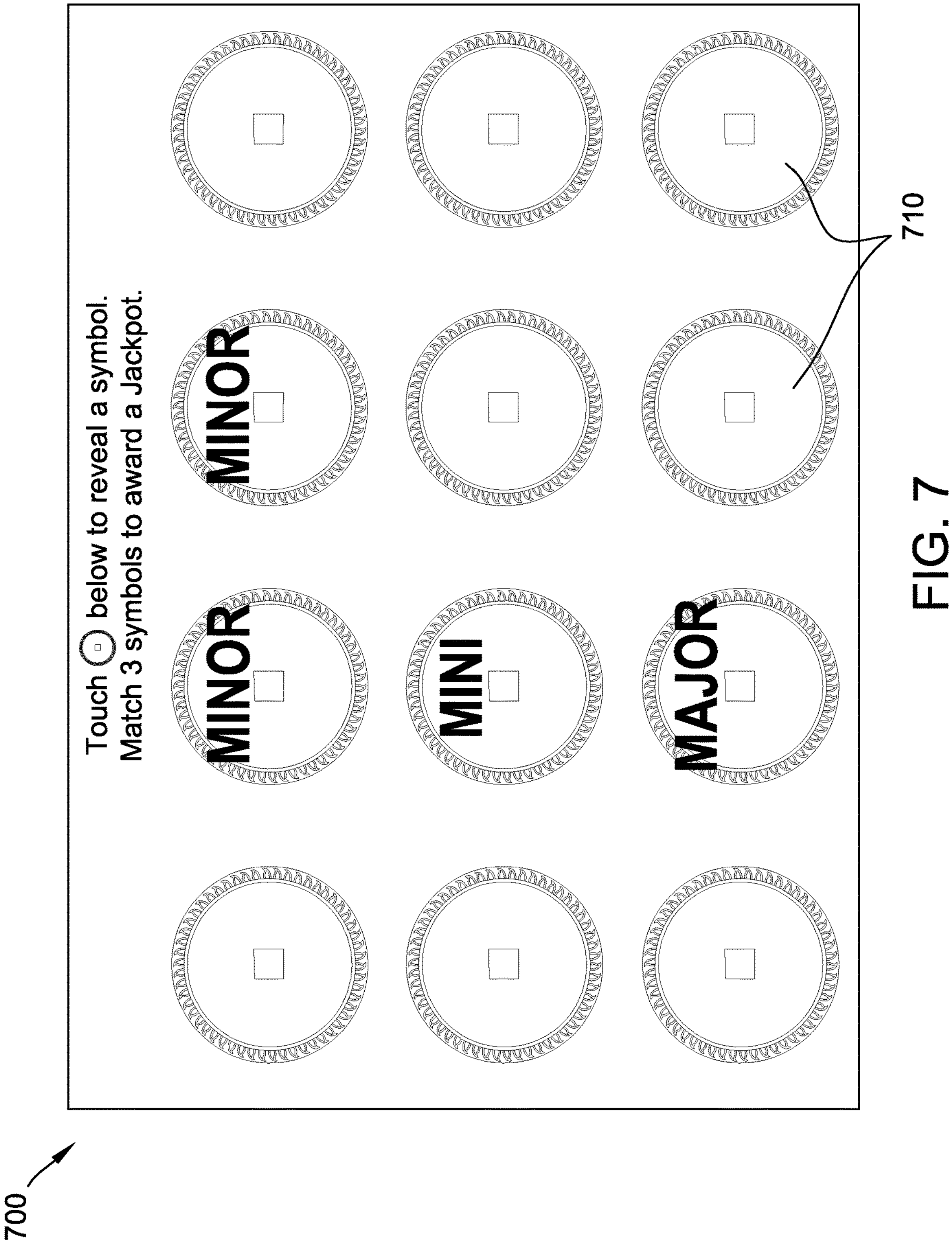
FIG. 7 is an example screen shot or user interface of a jackpot game in accordance with an embodiment of the present disclosure.

In an embodiment a second special symbol is a JACKPOT symbol 532, and a Jackpot feature is triggered by meeting a threshold COR symbol count for a reel when a JACKPOT second special symbols is associated (e.g., is above) the reel. A plurality of symbols are selected from a jackpot symbol set comprising at least one set of n matching symbols. The symbols selected from the jackpot symbol set are allocated to a set of m symbol display positions and obscured, for example covered by a common cover symbol. Each respective symbol is revealed in response to selection of the respective display position input via the player interface. A jackpot prize is awarded responsive to revealing n matching symbols. In an embodiment the Jackpot feature may be a second screen 700 feature as is illustrated in FIG. 7. In this feature 700 a player must pick symbols 710 and match 3 revealed symbols underneath to win a jackpot prize. The player may be restricted to selecting only 3 symbols. Alternatively, the player may be allowed to select more than 3 symbols, for example 5 symbols, while trying to locate matching symbols. This feature introduces additional variability into the likelihood of a prize being awarded, as the player must make a selection of the symbols. The prize may be a GRAND, MAJOR, MINOR BOUNS or MINI BONUS. The MINOR and MINI prizes may scale with a bet multiplier.

The combination of first special symbols (e.g., COR symbols) and a variety of different functions triggered using second special symbols provides a mechanism for varying volatility of game payouts within mandated RTP. In one embodiment, a predetermined weighting table is used to determine the likelihood of triggering one of the functions using a specific second special symbol. In that case, the backend system 314 makes a random determination to select the function of the second special symbol in accordance with the predetermined weighting table. In some embodiments, the weighting table may be interchanged with alternate weighting tables to achieve a targeted overall RTP for the game.

Both accumulated first special symbols and second special symbols may persist for more than one game round. Some second special symbols require occurrence of trigger conditions to enable the second special symbol function, the backend system 314 may include a trigger monitoring function to monitor trigger conditions for multiple different types of second special symbols, or for special trigger conditions based on combinations of symbols selected and displayed in the reel window for a game round. Either the second special symbol function or trigger condition for the second special symbol involves interaction between the second special symbol and a reel with which the second special symbol is associated for a game round. Thus, adjustment to volatility or payout probability may be made by adjusting the frequency of selection of second special symbols or second special symbol types. Alternatively or additionally, varying the numbers of first special symbols (e.g., COR symbols) on each reel may be used to adjust probabilities. Prize awards for each reel may be affected by operation of a second special symbol associated with the reel.

In some game rounds the game processing backend system 314 calls on the RNG engine 316 to determine whether or not to select a second special symbol. For example, in an embodiment a second special symbol may not be selected for every game round, whereas for a feature game a second special symbol may be selected for every game round, thus in the feature game rounds, by operation of increasing frequency of second special symbol selection, the game processing backend system 314 alters the probability of an award being based on a combination of both the accumulated first special symbols and a function applied by the second special symbol in the feature game.

The first special symbols for each reel are accumulated when they occur in game outcomes. The accumulated total of the first special symbols is able to persist and increase through play of two or more game rounds, up to a threshold where an award may be made based on the accumulated first special symbols. Examples of first special symbols include, but are not limited to only including, cash on reel symbols, credit on reel symbols, free game symbols, etc.

Meeting the accumulation threshold for the first special symbols may also be a trigger for application of any second special symbol associated with the reel. For example, where a second special symbol associated with the reel is a multiplier this is applied to modify the award, or for a jackpot, or free games to be initiated. A multiplier may also be applied to a number of free games awarded in accordance with the accumulated first special symbols.

Each selected second special symbol is associated with only one reel for each game round. When a second special symbol is selected for a game round the second special symbol is associated with a first reel, and for each subsequent game round the second special symbol persists and is associated with a subsequent reel. The second special symbol will persist and continue to be allocated to a subsequent reel until the second special symbol has been allocated to a defined sequence of reels (which may be all the reels) or the game is ended. A new second special symbol may be selected and added for each subsequent game round.

In an embodiment each selected second special symbol progresses sequentially though all of the reels, for example from an initial reel to a terminal reel (e.g., first to last), displayed progressing along a bank of vertically spinning reels from right to left. It should be appreciated that this may also be left to right, or for horizontally spinning reels up or down. In alternative embodiments, the second special symbols may be allocated initially to a central reel and alternately be allocated to subsequent reels in left and right (or up and down) directions towards the edge/terminal reels. In alternative embodiments the second special symbols may be "shuffled" to randomly move (or bounce) between reels for a set number of game rounds.

In an embodiment, a symbol set for a plurality of reels are defined for a game by the game processing backend system 314, wherein for at least one symbol set for one reel includes one or more first special symbols, the first special symbols including at least one symbol associated with an awardable value. The value may be a cash or credit amount. Other first special symbols to appear on the reels may include, but are not limited to only including, any one or more of symbols associated with an awardable value, symbols associated with an award of free game rounds, WILD symbols, scatter pay symbols, etc. First special symbols which are selected and displayed for each reel in a game outcome are counted and the count added to an accumulated total for the respective reel. The accumulated total number of first special symbols may be displayed in a collection area, for example in a column of display positions above the respective reel. The accumulated total is compared with a threshold for the respective reel and where the accumulates total meets or exceeds the threshold any award or awards associated with the accumulated first special symbols are applied.

A set of a plurality of second special symbols is also defined. The second special symbols may include, but are not limited to only including, any one or more of multiplier symbols, WILD symbols, Jackpot symbols, prize value symbols.

In an embodiment the gaming system may include a display; a credit input mechanism operable to establish credits on a credit meter that are increasable and decreasable responsive to player input and game play outcomes; a player interface comprising a display for displaying game outcomes to a player; a game play mechanism for operation by a player to input a wager from the established credits and to initiate a play of a game; and a game controller comprising a processor and memory storing instructions that, when executed by the processor, cause the game controller to, in response to input of a wager, execute play of a game by, for each game round: selecting, from a first set of symbols defined by symbol data using a random number generator, a plurality of symbols for display in a plurality of symbol positions associated with one or more reels to form a game outcome, the plurality of symbols including at least one first special symbol; determining, using the random number generator, whether or not to select a second special symbol from a second set of symbols, and where determined, selecting the second special symbol and associating the second special symbol with an initial reel; for second special symbols selected for a previous game round, associating each second special symbol with a subsequent reel for the game outcome, or removing a second special symbol from the game outcome where the second special symbol was associated with a terminal reel in the previous game round; evaluating the game outcome to determine any winning symbol combination occurring in the game outcome, and for each reel, accumulating any first special symbol occurring in the game outcome and determining whether an accumulation threshold for the reel is met, and if the accumulation threshold is met, determining a prize value based on the accumulated first special symbols and any second special symbol associated with the reel for the game outcome; and generate an award based on a total of prize values.

In an embodiment, accumulation thresholds defined for each reel differ for one or more reels. Accumulated first special symbols may be displayed in a plurality of respective display areas each associated with each respective reel.

The first special symbols included on each reel may differ for one or more reels.

In an embodiment the second set of symbols includes a plurality of symbols enabling different functions. The symbols included in the second set of symbols may include any one or more of WILD, Jackpot, and multiplier symbols.

In an embodiment, where a selected second special symbol is a WILD symbol, for the reel associated with the wild symbol, the reel becomes a wild reel the subsequent game round.

In an embodiment, where a selected second special symbol is a jackpot symbol, or a multiplier symbol, the function enabled by the selected second special symbol is triggered where, for the reel associated with the selected second special symbol, the first symbol accumulation threshold is met.

In an embodiment, a feature game is initiated in response to a feature game trigger. For each round of the feature game, a second special symbol is determined and selected.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the implementations described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the implementations described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary implementation, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments.

What is claimed is:

1. A gaming system comprising:

a display for displaying game outcomes of a game to a player; and a game controller in communication with the display and comprising a processor and memory storing instructions that are executable by the processor and that, when executed, cause the game controller to, for each game round of the game:

select, from a first set of symbols defined by symbol data using a random number generator (RNG), a plurality of symbols for display in a plurality of symbol positions associated with one or more reels included in a reel window to form a game outcome, the first set of symbols including at least one first special symbol;

determine, using the RNG, whether to select a second special symbol from a second set of symbols, and, where determined, select the second special symbol and associate the selected second special symbol with an initial reel of the one or more reels included in the reel window;

associate each second special symbol selected during a previous game round with a subsequent reel of the one or more reels for the game outcome, or remove a second special symbol selected during the previous game round from the game outcome where the second special symbol selected during the previous game round was associated with a terminal reel of the one or more reels in the previous game round;

evaluate the game outcome to determine any winning symbol combination occurring in the game outcome;

for each reel included in the reel window, accumulate any first special symbol occurring in the game outcome in an accumulated symbol column corresponding to the reel including the first special symbol in the game outcome, and determine whether an accumulation threshold for the reel is met, and if the accumulation threshold is met, determine a prize value based on the accumulated first special symbols included in the accumulated symbol column and any second special symbol associated with the reel having met the accumulation threshold; and generate an award based on a total of prize values.

2. The gaming system of claim 1, wherein accumulation thresholds defined for each reel differ for one or more reels.

3. The gaming system of claim 1, wherein, for each reel, the accumulated first special symbols are displayed in the accumulated symbol column corresponding to the reel.

4. The gaming system of claim 1, wherein a first special symbol occurring on one of the reels differs from a first special symbol occurring on another one of the reels.

5. The gaming system of claim 1, wherein the second set of symbols includes second special symbols enabling different functions.

6. The gaming system of claim 5, wherein the second special symbols included in the second set of symbols include any one or more of WILD, Jackpot, and multiplier symbols.

7. The gaming system of claim 6, wherein the selected second special symbol is a WILD symbol, and the reel associated with the wild symbol becomes a wild reel during a subsequent game round.

8. The gaming system of claim 6, wherein the selected second special symbol is a jackpot symbol or a multiplier symbol, and the function enabled by the selected second special symbol is triggered where, for the reel associated with the selected second special symbol, the first symbol accumulation threshold is met.

9. The gaming system of claim 8, wherein the selected second special symbol is a jackpot symbol, and wherein the instructions, when executed by the processor, further cause the game controller to initiate a jackpot game responsive to a trigger for the selected second special symbol associated with one of the reels, wherein a plurality of jackpot symbols are selected from a jackpot symbol set comprising at least one set of n matching jackpot symbols, and wherein the plurality of jackpot symbols selected from the jackpot symbol set are allocated to a set of m jackpot symbol display positions, and each respective jackpot symbol is revealed in response to a player selection of the respective jackpot symbol display position, and wherein a jackpot prize is awarded responsive to revealing the n matching jackpot symbols.

10. The gaming system of claim 9, wherein a limit of p jackpot symbol display positions are selectable, wherein $m>p$ and $p>=n$.

11. The gaming system of claim 1, wherein the instructions, when executed by the processor, further cause the game controller to initiate a feature game in response to a feature game trigger and, for each round of the feature game, determine and select a second special symbol.

12. The gaming system of claim 11, wherein for the feature game, the selected second special symbol is a WILD symbol, and wherein the instructions, when executed by the processor, further cause the game controller to convert the reel associated with the WILD symbol to a WILD reel for one or more rounds of the feature game.

13. A method of electronic gaming implemented on a gaming system, the method comprising:

executing play of a game including controlling display of game outcomes of the game; and for each game round of the game:

selecting, from a first set of symbols defined by symbol data using a random number generator (RNG), a plurality of symbols for display in a plurality of symbol positions associated with one or more reels included in a reel window to form a game outcome, the first set of symbols including at least one first special symbol;

determining, using the RNG, whether to select a second special symbol from a second set of symbols, and, where determined, selecting the second special symbol and associating the selected second special symbol with an initial reel of the one or more reels included in the reel window;

associating each second special symbol selected during a previous game round with a subsequent reel of the one or more reels for the game outcome, or removing a second special symbol selected during the previous game round from the game outcome where the second special symbol selected during the previous game round was associated with a terminal reel of the one or more reels in the previous game round;

evaluating the game outcome to determine any winning symbol combination occurring in the game outcome;

for each reel included in the reel window, accumulating any first special symbol occurring in the game outcome in an accumulated symbol column corresponding to the reel including the first special symbol in the game outcome, and determining whether an accumulation threshold for the reel is met, and if the accumulation threshold is met, determining a prize value based on the accumulated first special symbols included in the accumulated symbol column and any second special symbol associated with the reel having met the accumulation threshold; and generating an award based on a total of prize values.

14. The method of claim 13, wherein accumulation thresholds defined for each reel differ for one or more reels, and the method further comprises, for each reel, causing display of the accumulated first special symbols in the accumulated symbol column corresponding to the reel.

15. The method of claim 13, wherein the second set of symbols includes second special symbols enabling different functions, the second special symbols including any one or more of WILD, Jackpot, and multiplier symbols.

16. The method of claim 15, wherein the selected second special symbol is a jackpot symbol or a multiplier symbol, and the method further comprises triggering the selected second special symbol when, for the reel associated with the selected second special symbol, the first symbol accumulation threshold is met.

17. The method of claim 16, wherein the selected second special symbol is a jackpot symbol, and the method further comprises:

initiating a jackpot game responsive to a trigger for the selected second special symbol associated with one of the reels, wherein a plurality of jackpot symbols are selected from a jackpot symbol set comprising at least one set of n matching jackpot symbols, and wherein the plurality of jackpot symbols selected from the jackpot symbol set are allocated to a set of m jackpot symbol display positions; and revealing each respective jackpot symbol in response to a player selection of the respective jackpot symbol display position; and awarding a jackpot prize responsive to revealing the n matching jackpot symbols.

18. The method of claim 13, further comprising initiating a feature game in response to a feature game trigger and, for each round of the feature game, determining and selecting a second special symbol.

19. The method of claim 18, wherein for the feature game, the selected second special symbol is a WILD symbol, and the method further comprises converting the reel associated with the WILD symbol to a WILD reel for one or more rounds of the feature game.

20. A non-transitory computer-readable storage medium with instructions stored thereon that, in response to execution by at least one processor, cause the at least one processor to:

execute play of a game including by controlling display of game outcomes of the game; and for each game round of the game:

select, from a first set of symbols defined by symbol data using a random number generator (RNG), a plurality of symbols for display in a plurality of symbol positions associated with one or more reels included in a reel window to form a game outcome, the first set of symbols including at least one first special symbol;

determine, using the RNG, whether to select a second special symbol from a second set of symbols, and, where determined, select the second special symbol and associate the selected second special symbol with an initial reel of the one or more reels included in the reel window;

associate each second special symbol selected during a previous game round with a subsequent reel of the one or more reels for the game outcome, or remove a second special symbol selected during the previous game round from the game outcome where the second special symbol selected during the previous game round was associated with a terminal reel of the one or more reels in the previous game round;

evaluate the game outcome to determine any winning symbol combination occurring in the game outcome;

for each reel included in the reel window, accumulate any first special symbol occurring in the game outcome in an accumulated symbol column corresponding to the reel including the first special symbol in the game outcome, and determining whether an accumulation threshold for the reel is met, and if the accumulation threshold is met, determine a prize value based on the accumulated first special symbols included in the accumulated symbol column and any second special symbol associated with the reel having met the accumulation threshold; and generate an award based on a total of prize values.

* * * * *